United States Patent [19]

Siwiak

[11] Patent Number: 5,537,398
[45] Date of Patent: Jul. 16, 1996

[54] APPARATUS FOR MULTI-RATE SIMULCAST COMMUNICATIONS

[75] Inventor: Kazimierz Siwiak, Coral Springs, Fla.

[73] Assignee: Motorola, Inc., Schaumburg, Ill.

[21] Appl. No.: 439,839

[22] Filed: May 12, 1995

[51] Int. Cl.$^6$ ............................... H04B 7/00; H04J 1/02; H04J 11/00
[52] U.S. Cl. ............................... 370/19; 370/23; 370/69.1; 370/84; 370/92; 370/110.1; 455/51.2; 455/56.1
[58] Field of Search ................................ 370/19, 21, 23, 370/49.5, 50, 60.1, 70, 84, 92, 93, 94.1, 95.1, 95.3, 99, 110.1; 375/260; 340/311.1; 455/15, 16, 51.2, 56.1

[56] References Cited

U.S. PATENT DOCUMENTS

| | | | |
|---|---|---|---|
| 4,891,637 | 1/1990 | Siwiak et al. | 340/825.44 |
| 5,228,025 | 7/1993 | Le Floch et al. | 370/20 |
| 5,239,306 | 8/1993 | Siwiak et al. | 340/825.44 |
| 5,313,169 | 5/1994 | Fouche et al. | 329/302 |
| 5,345,440 | 9/1994 | Gledhill et al. | 370/19 |
| 5,357,502 | 10/1994 | Castelain et al. | 370/19 |
| 5,371,548 | 12/1994 | Williams | 348/478 |
| 5,406,551 | 4/1995 | Saito et al. | 370/19 |
| 5,452,288 | 9/1995 | Rahuel et al. | 370/19 |
| 5,471,464 | 11/1995 | Ikeda | 370/19 |

OTHER PUBLICATIONS

"The Coded Orthogonal Frequency Division Multiplexing (COFDM) Technique, and its Application to Digital Radio Broadcasting Towards Mobile Receivers", J. C. Rault, D. Castelain, B. LeFloch, CCETT (Centre Commun d'Etudes de Telediffusion et Telecommunications), 1989 IEEE, pp. 0428-0432.

*Primary Examiner*—Hassan Kizou
*Attorney, Agent, or Firm*—R. Louis Breeden

[57] ABSTRACT

A messaging system (500) for transmitting a message to a subscriber unit (312). The messaging system (500) includes a plurality of geographically distributed messaging transmitters (302–310), each transmitter designed to transmit in a first modulation format, such as FM, during a first transmission portion (102) including address information; and in a second modulation format, such as OFDM, during a second transmission portion (104) including message data (110) transmitted in frames. The address information includes message characterization information (108) defining a predetermined frame rate. The second transmission portion (104) includes message data (110) transmitted in frames representing a time sequence of N data bits at the predetermined frame rate and provides a plurality of carrier frequencies related to a frequency domain representation of the time sequence of data bits. The predetermined frame rate numerically matches the predetermined symbol rate. The subscriber unit (312) includes circuitry for receiving and demodulating both modulation formats.

23 Claims, 4 Drawing Sheets

APPARATUS FOR MULTI-RATE SIMULCAST COMMUNICATIONS

FIELD OF THE INVENTION

This invention relates in general to a method and apparatus for a high speed simulcast multi-rate data messaging and paging system. More particularly, this invention relates to a method and apparatus for a high speed simulcast multi-rate data messaging and paging system utilizing orthogonal frequency division multiplexing.

BACKGROUND OF THE INVENTION

There are numerous communication systems in operation today which utilize frequency modulation (FM). In current paging systems, for example, paging signals are transmitted from a paging transmitter to a multiplicity of portable paging receivers according to a pre-specified transmission protocol which includes, for example, serialized digitally coded synchronization, address, and message data words. The transmitters in current simulcast high data rate paging systems are spaced in order to minimize differential delay problems resulting from differences in time required for the paging signals to propagate from the transmitters. Specifically, the transmitter spacing distance is limited by differential delays associated with the reciprocal of the channel symbol rate. Differential delays between simulcast transmitters can cause severe problems when the differential delay between simulcast transmitters is larger than a fraction, usually in the neighborhood of ¼ or ⅓ of the symbol time (Ts) for the channel rates. For example, Ts=1/2400 for a channel rates of 2400 BPS. Thus transmitters are usually spaced no further apart than some distance "X" which ensures that differential delays within the service area are smaller than ¼ or ⅓ of Ts. This poses a problem where it is desired to send data at a significantly higher data rate. The restriction for the placement of transmitters also causes a high transmitter density requirement, which leads to higher costs due to an increased number of transmitters.

Thus, there is a need in the art for a messaging and paging system in which data can be sent at a higher speed than is available with currently feasible transmitter spacing. There is also a need in the art for a messaging and paging system with multiple-transmitters disposed to cover a geographic area where the coverage is based solely on signal strength and not on differential delay, thereby permitting lower transmitter density in a coverage area. There is a further need in the art for a messaging and paging system in which the simulcast characteristics of a high speed transmission can be chosen essentially independently of the channel data rate, up to the constraint of available bandwidth.

DESCRIPTION OF THE PREFERRED EMBODIMENT

The invention comprises a simulcast message delivery system utilizing a first modulation method, such as FM, and a second modulation method, such as the well-known Orthogonal Frequency Division Multiplexing (OFDM) modulation method. The transmission format incorporates a protocol to notify the subscriber unit of the modulation method. The transmission format utilizes well known Fast Fourier Transform (FFT) encoding for the OFDM modulation format. The paging system incorporates multiple transmitters disposed to cover a geographic area where the coverage can be based solely on signal strength and not on differential delay.

Generally described, the preferred embodiment of the present invention comprises a messaging system for transmitting messages to a plurality of data communication receivers (i.e., pagers, selective call receivers). The messaging system includes a plurality of geographically distributed messaging transmitters, each comprising means for generating a radio frequency signal. The transmitters each include means for modulating, in a first modulation format, such as FM, a first transmission portion including address and other information, such as message characterization information; and means for modulating, in a second modulation format, such as OFDM, a second transmission portion including message data transmitted in frames; and means for transmitting the radio frequency signal. Protocols, e.g., Motorola's well-known FLEX™ protocol, exist which support vectoring to time segments within the synchronization frame structure to allow different modulations to be utilized for a transmission.

Figure 2:
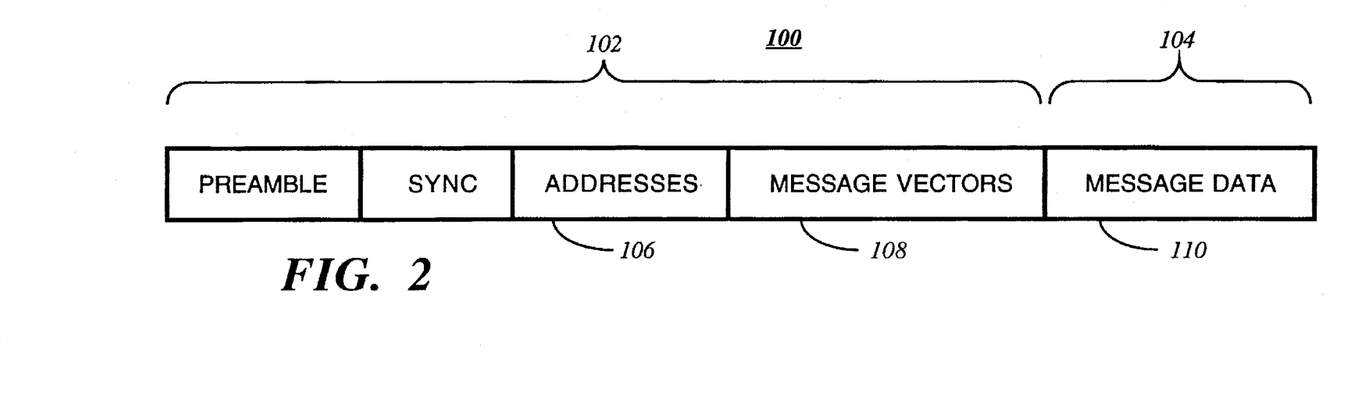
FIG. 2 is a example of a protocol suitable for use with the present invention.

Each of the plurality of data communication receivers includes receiver circuitry for receiving and demodulating the radio frequency signal transmitted in the first modulation format; means for decoding the selective call address information and the message characterization information transmitted in the first modulation format; receiver circuitry, responsive to the message characterization information transmitted during the first transmission portion, for receiving and demodulating the radio frequency signal transmitted in the second modulation format; and means for decoding the message data transmitted in the second modulation format. The address uniquely identifies the data communication receiver (or a group of data communication receivers) to which the message is directed, and the message characterization information identifies an information service, among other things. As illustrated in FIG. 2, the paging system includes a transmission format protocol 100 which has two portions. The first transmission portion 102 is sent in a first modulation format, for example FM. The first transmission portion allows the subscriber unit receivers to work in a lower power consumption mode which enhances battery life. The second transmission portion 104 is sent in a second modulation format, preferably OFDM, which requires the receiver to work in a higher power mode. The first transmission portion 102, which includes pager addresses 106 and message vectors 108, can be sent at one of several data rates depending on traffic, such as 1600 BPS 2-level FM, 3200 BPS 2-level FM, 3200 BPS 4-level FM and 6400 BPS 4-level FM, as can be provided by using the FLEX™ protocol.

The subscriber unit receiver is a dual mode receiver, similar to that described in U.S. Pat. No. 5,239,306, assigned to the assignee of the present invention, incorporated herein by reference and described below. The dual mode receiver of said patent operates in a system which utilizes FM for sending address and message characterization information, and which utilizes a linear modulation format for sending a plurality of analog voice messages simultaneously. The receiver receives the address and message characterization information, which specifies a portion of the transmitted bandwidth to be received by the receiver. The receiver then receives and demodulates the specified portion of the transmitted bandwidth to decode at least one of the plurality of voice messages.

Figure 1:
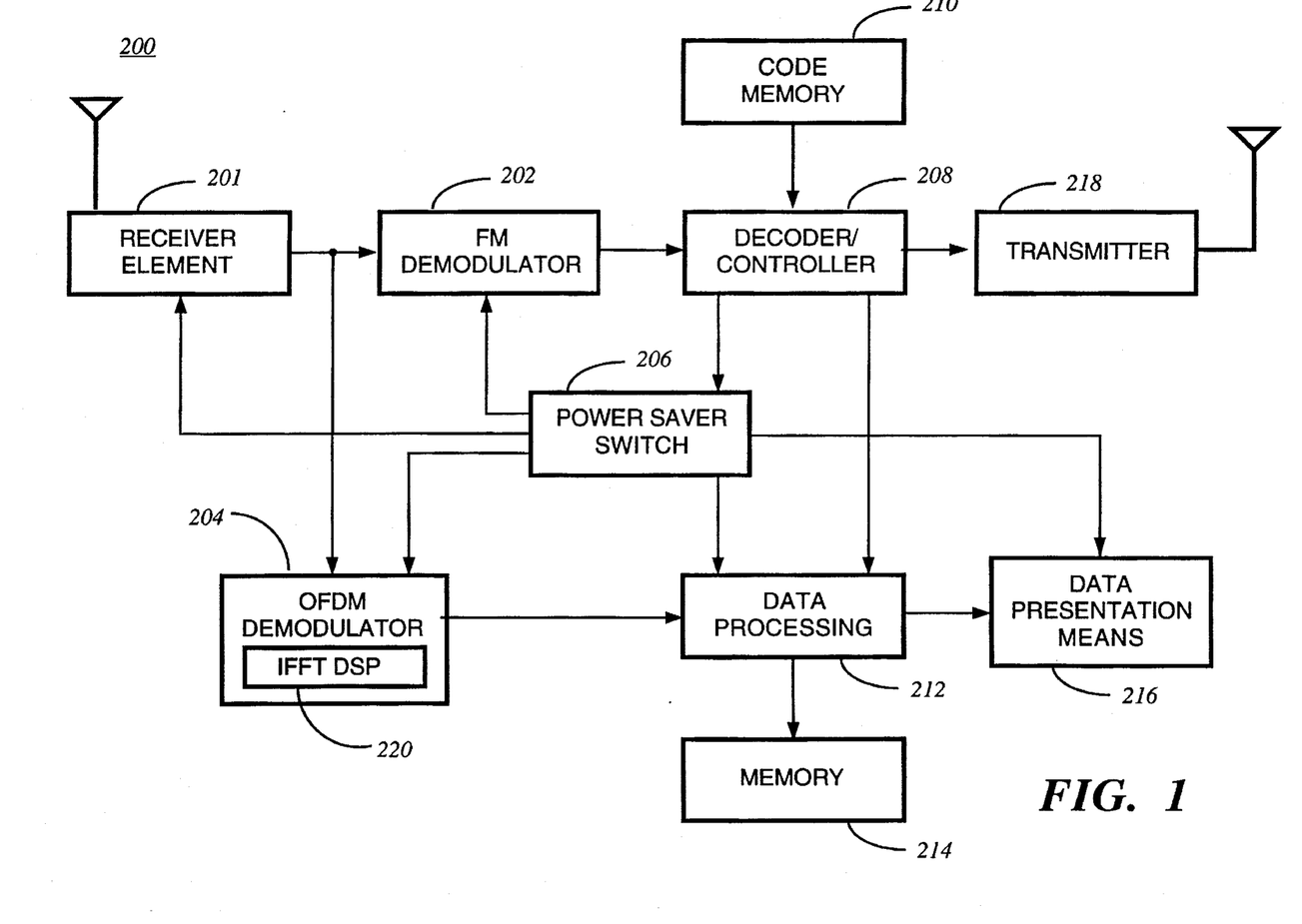
FIG. 1 is an electrical block diagram of a dual-mode receiver in accordance with the preferred embodiment of the present invention.

Turning now to FIG. 1, a data communication receiver 200 of the preferred embodiment of the present invention is designed to receive address and message characterization information transmitted in a first modulation format, such as FM, and data in a second modulation format, such as OFDM, on a common channel. The data communication receiver 200 comprises a conventional receiver element 201, comprising a radio frequency (RF) amplifier, a down conversion element, and an IF amplifier, which utilize techniques well known in the art. The receiver element 201 is coupled to a first (e.g., FM) demodulator 202 for detecting information transmitted in the first modulation format, which requires low power. A second (e.g., OFDM) demodulator 204 is also coupled to the receiver element 201 for detecting data transmitted in the second modulation format, which requires higher receiver power consumption. The detected data in the second modulation format occupies substantially the full transmitted bandwidth. The second (e.g. OFDM) demodulator 204 preferably utilizes inverse FFT (IFFT) processing in a Digital Signal Processor (DSP) 220, such as the DSP56000 digital signal processor manufactured by Motorola, Inc. of Schaumburg, Ill., to demodulate the OFDM modulation format utilizing techniques well known in the art. A conventional power saver switching circuit 206 is also provided for selectively supplying power to the respective demodulators 202, 204.

In operation, the transmitters 302–310 (FIG. 5) preferably send a signal having a transmission format protocol which has two portions. The first transmission portion 102 is sent in a first modulation format, for example FM, and has the pager addresses 106 and message vectors 108. The information in the first modulation format is received by the receiver element 201. A power saver switch 206, under the control of a decoder/controller 208 supplies the power to the receiver element 201 to enable the reception of this transmitted information. The power saver switch 206 also couples to an FM demodulator 202 to enable the FM modulated information received by the receiver element 201 to be demodulated. The demodulated information is provided to the decoder/controller 208. A code memory 210 is provided which couples to the decoder/controller 208, and which stores address information assigned to the particular unit. When an address from the sent addresses 106 is detected in the demodulated information which corresponds to the predetermined address information assigned to the particular unit, then the unit demodulates the message vectors 108, which contain the parameters that inform the unit of the speed and modulation format with which the remaining message characterization information is to be transmitted and the location within the message block 110 which contains the start of the message.

If the parameters call for a second modulation format for the second portion 104 of the transmission format protocol 100, power to the FM demodulator 202 is suspended by the power saver switch 206, under control of the decoder/controller 208, and power is then supplied to the second demodulator 204, which in the preferred embodiment of the invention is an OFDM decoder, utilizing inverse FFT processing. The second demodulator 204 enables demodulation of the data received in the second (OFDM) format for the second portion 104 of the transmission format protocol 100. The information received in the second modulation format is received by the receiver element 201, which then couples the received data to the OFDM demodulator 204. The demodulated message data is coupled from the output of the OFDM demodulator 204 to the input of a data processing unit 212. The decoder/controller 208 is coupled to the data processing unit 212, enabling the data processing unit 212 to process message data received in the second modulation format. The processed information is temporarily stored in a memory 214 and can be recalled by the user and displayed on the data presentation means 216. Once the message data is complete, the power to the OFDM demodulator 204 is suspended by the power saver switch 206, under control of the decoder/controller 208. The data communication receiver 200 preferably also includes a conventional FSK FM transmitter 218 coupled to the decoder/controller 208 for sending acknowledgment transmissions. It will be appreciated that in an alternative embodiment the transmitter 218 can be omitted.

As shown in FIG. 2, when a message transmission is initiated on the channel, the first transmission portion 102, modulated in the well-known FM format, is transmitted on the channel. The first transmission portion 102 includes a preamble and synchronization bits, followed by the pager address in the address block 106 and message vectors 108 which contain the information as to the modulation format of the message data 110 in the second transmission portion 104.

Figure 3:
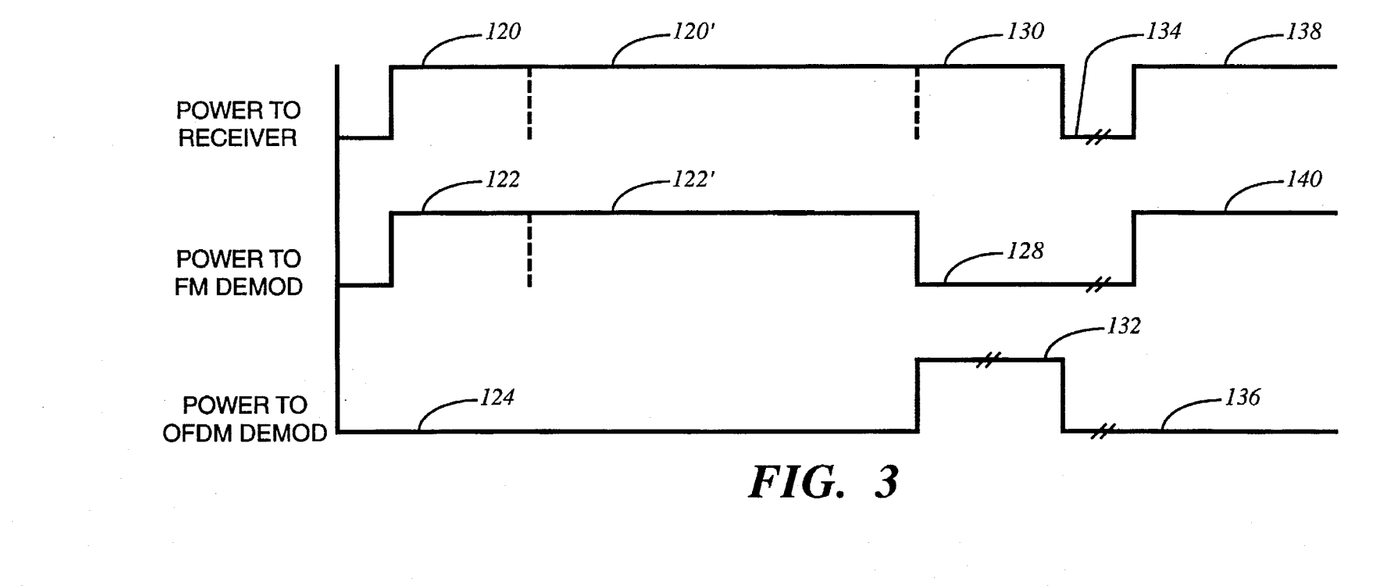
FIG. 3 is a timing diagram of the power to the receiver, FM demodulator and OFDM demodulator of the dual-mode receiver shown in FIG. 1 in accordance with the preferred embodiment of the present invention.

FIG. 3 is a timing diagram describing the power supplied to the data communication receiver 200 of the present invention. Power is initially supplied to the receiver element 201, during time interval 120, and to the FM demodulator 202, during time interval 122, to enable receiving of the preamble and synchronization word information modulated in the FM format. The supply of power to the OFDM demodulator 204 is inhibited during time interval 124, thereby conserving power within the unit. After having detected the preamble and sync word, the supply of power to the receiver element 201 is maintained during time interval 120', and to the FM demodulator 202 during time interval 122', in order to receive and additional address and message characterization information transmitted in the first transmission portion. The supply of power to the receiver element 201 is maintained in time interval 130 since the next transmission portion includes the high speed OFDM modulated data directed to the data communication receiver 200. However, the supply of power to the FM demodulator 202 is suspended during time interval 128, and power is supplied to the OFDM demodulator 204, during time interval 132. After receiving the high speed OFDM modulated data during time interval 132, the supply of power is suspended during time interval 134 to the receiver element 201 and during time interval 136 to the OFDM demodulator 204. Power is again supplied to the receiver element 201 during time interval 138, and to the FM demodulator 202, during time interval 140, to again enable reception of new messages. By supplying power to the OFDM demodulator 204 only during the second transmission portion 104 of high speed data, the receiver battery life can be greatly extended as compared to receiving all information in the high speed, high power consumption OFDM format.

One system for transmission of digital data using OFDM is described in U.S. Pat. No. 5,371,548, incorporated herein by reference and described below. Basically, OFDM is a data transmission technique which divides a data stream into a plurality of data streams ("frames"), each of which has a lower frame rate than the original data stream bit rate. Each of these relatively low rate data streams ("frames") is then used to modulate its own separate carrier signal. In order to provide maximum bandwidth efficiency, and to allow ease of processing, the carrier signals must be mutually orthogonal. That is, any two or more signals are orthogonal if the integral of their product over a defined period of time is equal to zero.

The Fourier transform is a technique for representing time-based data in frequency-based domain. Fourier transforms lend themselves to OFDM techniques because the sine and cosine functions which provide the basis for the Fourier transform, are orthogonal functions. Because of the advances in the area of digital signal processing, implementation of OFDM has become significantly more practicable and efficient. This is largely due to improved hardware, software, and algorithms that have been developed to implement the discrete Fourier transform more efficiently. These algorithms are called fast Fourier transforms (FFT).

Figure 4:
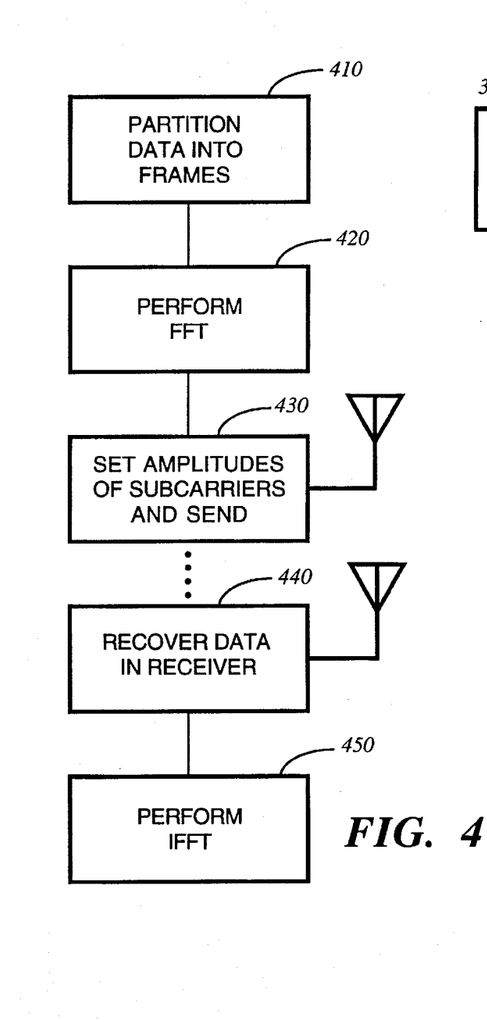
FIG. 4 is a flow diagram of the OFDM modulation and demodulation in accordance with the preferred embodiment of the present invention.

The basic principal of the OFDM modulation format of the present invention during the second transmission portion 104 is shown in FIG. 4, and comprises the following steps: 1) partition data intended for high speed transmission at a data rate of S bits per second into "frames" containing N bits each, where the number N is preferably, but not necessarily, a power of two; 410 2) perform a Fast Fourier Transform (FFT) on each frame of N bits to obtain FFT{N}={N "real" and N "imaginary" values} every N/S seconds; 420 3) use the N complex amplitudes FFT{N} to set the amplitudes of N subcarriers which are then sent for a time period of Ttx=N/S seconds and which are spaced in frequency at the inverse of the frame period (The bandwidth B of the transmission is therefore essentially B=N/Ttx Hz); 430 and 4) recover data in a receiver by sampling the channel N times every Ttx seconds, 440, and performing the inverse FFT (IFFT), which recovers the N bits of the original bit stream in that frame, 450. The parameter N (=bits per OFDM frame) in the transmission format can be selected based on the required data rate during the second transmission period. The value of N preferably is a variable which is transmitted during a first transmission period within the protocol. It will be appreciated that, alternatively, N can be a fixed system parameter.

In the present invention, the frames represent a time sequence of N data bits at a predetermined frame rate. The second modulation format comprises a multicarrier modulation format providing a plurality of carrier frequencies related to a frequency domain representation of the time sequence of data bits.

A selection method for selecting the parameters of the second modulation method is based on a system determined requirement for data rate and system derived selection of simulcast transmission sites. In the preferred embodiment of the invention, N is chosen so that the OFDM "frame" rate of the second transmission portion 104 is "matched" with the symbol rate of the first transmission portion 102. The rates need not be matched exactly, as long as the rates do not exceed constraints on the system. In the preferred embodiment, the predetermined frame rate is less than the data bit rate. The address information is transmitted at a predetermined symbol rate, and the predetermined frame rate numerically matches the predetermined symbol rate. The address information includes message characterization information defining the predetermined frame rate.

Therefore, a simulcast paging system designed to work at a symbol rate of, for example, 2400 symbols per second during the first transmission portion 102, will also work with an OFDM frame rate of 2400 frames per second during the second transmission portion 104. The data rate during the second transmission portion 104 is 2400N bits per second and the bandwidth is B=2400N Hz, where N is the system parameter. For example, since channel spacing is often 25 kHz, the usable bandwidth often is approximately 20 kHz. Accordingly, an appropriate value for N is the integer portion of 20,000/2,400, so N=8.

An advantage of the present invention is that the simulcast differential delay problem is now associated only with a "frame" period of Ttx=N/S seconds rather than with the symbol period of 1/S seconds. Accordingly, this invention effectively removes the restriction on transmitter spacing by using the Orthogonal Frequency Division Multiplexing (OFDM) form of channel modulation for the second, or high speed, portion of the transmission, and standard FSK FM for the first, or low speed, transmissions. The simulcast characteristics of the high speed transmission portion are chosen essentially independently of the channel data rate up to the constraint of available bandwidth. Therefore, the invention permits lower transmitter density in a coverage area, and hence lower subscriber cost because of lower infrastructure costs.

In an alternative embodiment of the invention, Coded Orthogonal Frequency Division Multiplexing (COFDM) can be substituted for OFDM which is an equivalent variant of OFDM. COFDM includes an interleaving method which mitigates the fading effects of multipath propagation. Interleaving is a well known technique in which, for example, the data streams are assembled into a matrix by rows and then transmitted on the channel by columns. This technique allows a burst error on the channel to corrupt only a limited number of bits from each transmitted code word in the data stream. If the code words in the data stream allow appropriate error correction, the message is decoded correctly despite the burst error.

In another embodiment of the invention, the modulation during the first transmission portion is also OFDM (or COFDM) sent at a slower data rate that is predetermined in the system and remains fixed. In this embodiment, the receiver need not be a dual-mode receiver, since only one type of demodulation will be necessary. Accordingly, the first modulation format is a multicarrier modulation of Orthogonal Frequency Division Multiplexing, and the address information is transmitted at a predetermined address frame rate, wherein an address frame represents a time sequence of N' data bits, and wherein the predetermined frame rate substantially numerically equals the predetermined address frame rate. Preferably, N is greater than N' (data bits).

In this embodiment, the receiver includes only one OFDM demodulator. For example, the first modulation could be 6400 BPS with two bits per frame, which equals a frame rate of 3200 frames per second. The modulation during the second transmission period is OFDM (or COFDM) at a second transmission rate which is faster than the first transmission rate. For example, 51,200 BPS at 16 bits per frame, which also equals 3200 frames per second. Again, as in the first embodiment of the invention, the frame rates in the two transmission periods are "matched" in order to equalize the differential delay problem. The slower data rate in the first transmission portion allows the subscriber unit receivers to work in a slower, lower power consumption mode, which enhances battery life.

The energy per bit (watt seconds) is related to the total transmitter power (watts) divided by the bit rate (bits/seconds) on the channel. Thus a slower channel bit rate, as for example OFDM at two bits per frame with a fixed frame rate and a fixed power level, devotes more energy per transmitted bit than, for example, OFDM at 16 bits per frame. By using acknowledge transmissions from the subscriber unit (coded to indicate receiver signal quality or signal strength) in response to sent address and message characterization information in the first, slower portion of the protocol, the data rate during the second, faster portion of the protocol, can be adjusted to optimize the higher speed data transmissions based on signal quality or signal strength at the subscriber unit.

In the preferred embodiment, the system is designed to know the location of a particular subscriber unit. Preferably, location is determined with an acknowledge-back signal from a two-way pager. Alternatively, location can be determined by a user pre-registering his location with the messaging terminal 314 (FIG. 5), among other methods. In this situation, the number of simultaneous transmitters during the second transmission portion can be different from the number of simultaneous transmitters during the first portion.

Preferably, the data communication receiver 200 includes the transmitter 218 for transmitting a signal indicating a present geographical location of the selective call receiver. The messaging terminal 314 further includes a transmitter select means 316 (FIG. 5), responsive to the signal indicating the present geographical location of the data communication receiver 200, for selectively transmitting from a subset of the plurality of transmitters 302–310 (FIG. 5) the second transmission portion 104. In this situation, the predetermined number of bits per frame (N) can be adjusted based upon the present geographical location.

In certain situations, the subset of transmitters can be only one transmitter. In that case, there are no differential delay problems. Accordingly, the predetermined number of bits per frame (N) can be adjusted based upon the present geographical location and on a calculated signal strength and on a predetermined maximum transmission channel rate without regard to differential delay characteristics.

Figure 5:
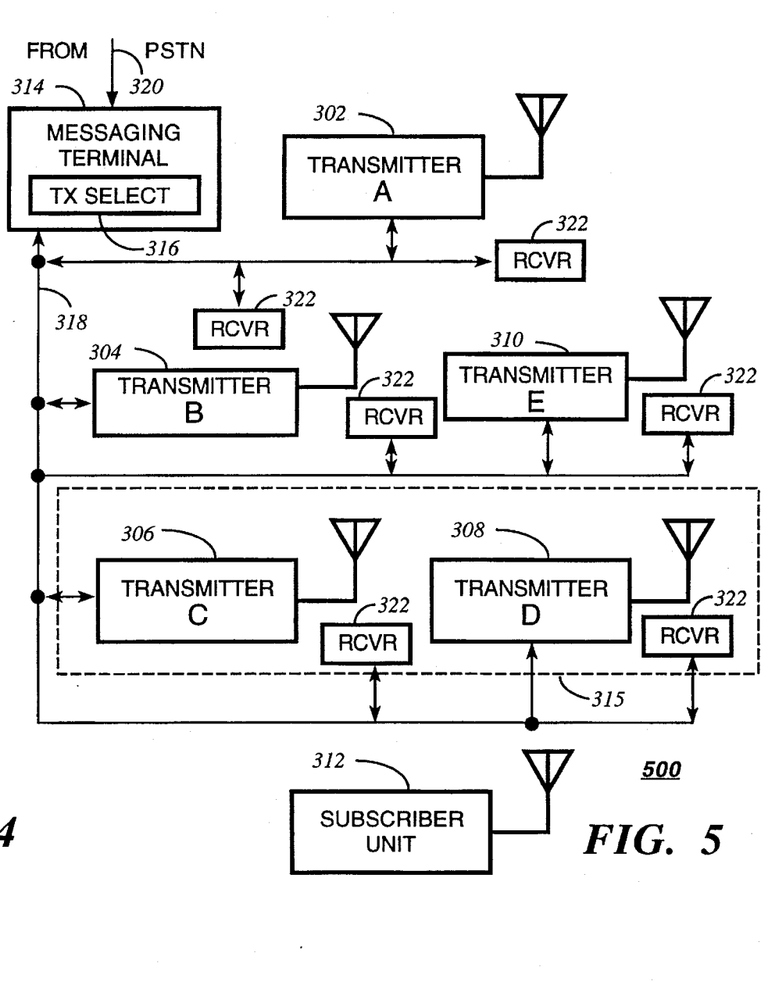
FIG. 5 is an electrical block diagram of a messaging system in accordance with the preferred embodiment of the present invention.

In general, the sensitivity to simulcast distortion can be different for the two transmission portions 102, 104 because different combinations of the transmitters 302–310 can be used. Given that a data rate S is required, the system parameter N for the second transmission portion 104 is adjusted so that simulcast differential delay is not a problem for the particular subset combination of the transmitters 302–310 that are selected for the second portion 104 sent as a simulcast transmission.

In the preferred embodiment utilizing an acknowledge-back paging system, the number of, and the selection of particular transmitters 302–310 to simultaneously transmit during the second transmission portion 104 are based on an acknowledge-back transmission from the subscriber unit operating in the paging system. "Acknowledge-back" pagers are those selective call receivers (pagers) that not only receive but also transmit (automatically and/or manually) an acknowledge signal in response to receiving their selective call address or a message, such as that described in U.S. Pat. No. 4,891,637 to *Siwiak et al.* assigned to the assignee of the present application, incorporated herein by reference and described below.

The components of an acknowledge-back pager, generally include an antenna coupled through a transmit/receive switch to either a transmitter or a receiver. The receiver circuits usually comprise a combination of filters, mixers and oscillators. The receiver circuits generate a recovered signal suitable for processing by a discriminator which generates a recovered analog signal that represents binary states. The binary states represent bits of the digitally coded words of the paging signal. After receiving a message, acknowledge-back data can be transmitted. The user can input the data to be transmitted into the microprocessor by a variety of means. Alternatively, the pager can automatically send certain messages back. The microprocessor processes the data and supplies binary output data to the input port of a digital to analog (D/A) converter. The output signal is passed to the transmitter for processing and transmission.

In the preferred embodiment utilizing an acknowledge-back paging system, the messaging system 500 comprises a plurality of transmitters 302, 304, 306, 308, and 310, as shown in FIG. 5. The transmitters 302–310 are coupled by a communication link 318 to the messaging terminal 314 for control thereby. A plurality of conventional FSK FM receivers 322 are disposed throughout the coverage area of the transmitters 302–310 and are also coupled to the messaging terminal 314 by the communication link 318. The receivers 322 are for receiving an acknowledge-back response from the subscriber unit 312 to determine the location of the subscriber unit 312. The messaging terminal 314 preferably is similar to that of the MPS 2000™ paging control center manufactured by Motorola, Inc. of Schaumburg, Ill., and is coupled to the Public Switched Telephone Network (PSTN) by telephonic links 320 for receiving message originations therefrom using techniques well known in the art.

Using conventional control techniques, the transmitters 302–310 are controlled by the messaging terminal 314 to transmit the first transmission portion 102 in a first modulation format, such as FM. When the address of a particular subscriber unit 312 is sent, that unit responds with an acknowledgment signal. The subscriber unit 312 preferably is similar to the data communication receiver 200. It will be appreciated that, alternatively, other similar receivers can be utilized for the subscriber unit 312. With this acknowledgment signal, the system is now able, using well-known techniques, to pinpoint the location of the subscriber unit to which the message will be sent. It will be appreciated that, alternatively, the location of the subscriber unit 312 can be pre-registered with the messaging system 500.

The subscriber unit 312 can, for example, be nearest the transmitter 306. Therefore, the system transmits the remaining message only from transmitter 306, thereby eliminating any differential delay problems. On the other hand, the subscriber unit 312 can be near a subset of transmitters 315, such as transmitters 306 and 308. The messaging system 500 then transmits from both transmitters 306 and 308, but takes into account the particular differential delay problems associated with only these two transmitters 306, 308, rather than the entire set of transmitters 302–310. Similarly, in an alternative embodiment utilizing a registration system, the messaging system 500 could transmit only from those transmitter(s) 302–310 near the location of the subscriber unit 312, and adjust for differential delay problems accordingly. The nature of simulcast differential delay is fixed with respect to the geographical locations of particular transmitters, in this case, a particular subset of transmitters 302–310. The differential delay characteristics, therefore, can be determined once during system design and implementation for all the required combinations or subsets of the transmitters 302–310. This information, further cross-referenced to maximum transmission frame rate, is then available during system operation to control the frame rate of the second transmission portion 104 based on subscriber unit location.

Another embodiment is a paging system or message delivery system in which data sent in the first and/or second transmission portions 102, 104 are time-interleaved for the purpose of mitigating multipath fading effects. Hence, another embodiment includes a paging system having a transmission protocol that additionally incorporates one or more combinations of data bit, frame, and word interleaving, where the interleaving depth and the interleaving manner are chosen to provide a certain performance level in the second transmission period appropriate for the mix of transmitters simultaneously transmitting during the second transmission period. There are several ways of choosing the depth and particular method of interleaving. For example, data words can be interleaved over entire frames, as well as within frames.

Figure 6:
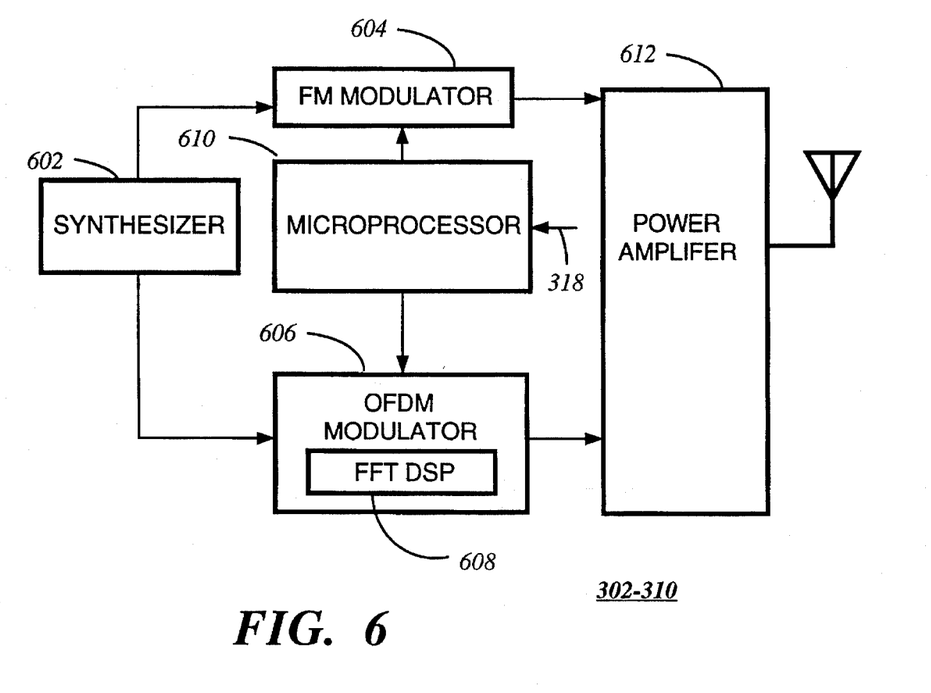
FIG. 6 is an electrical block diagram of a portion of a transmitter in accordance with the preferred embodiment of the present invention.

FIG. 6 is an electrical block diagram of a portion of the transmitter 302–310 in accordance with the preferred embodiment of the present invention. The transmitter 302–310 comprises a conventional synthesizer 602 for generating a carrier frequency. The synthesizer 602 is coupled to a conventional FM modulator 604 for modulating the carrier frequency during the first transmission portion 102. The synthesizer 602 also is coupled to a conventional OFDM modulator 606 comprising a DSP 608 for calculating Fast Fourier Transforms in a well-known manner for modulating the carrier frequency during the second transmission portion 104. The FM modulator 604 and the OFDM modulator are coupled to a conventional microprocessor 610 for control thereby. The microprocessor 610 is coupled to the communication link 318 for communicating with the messaging terminal 314 in a manner well known in the art. The modulators 604, 606 are coupled to a conventional power amplifier 612 for transmitting the first transmission portion 102 as an FM signal, and for transmitting the second transmission portion 104 as an OFDM signal.

Thus, it is apparent that there has been provided, in accordance with the present invention, a method and apparatus for providing a high speed simulcast multi-rate data messaging and paging system utilizing orthogonal frequency division multiplexing. While the invention has been described and illustrated with reference to specific embodiments thereof, it is not intended that the invention be limited to these illustrative embodiments. One of ordinary skill in the art will recognize, after review of the foregoing description, that variations and modifications differing from the illustrative embodiments are possible. It is intended that all such variations and modifications as fall within the spirit and scope of the invention be included within the appended claims.

What is claimed is:

1. A messaging system for transmitting a message to at least one of a plurality of data communication receivers, the messaging system comprising a plurality of geographically distributed messaging transmitters, each comprising:

means for generating a radio frequency signal comprising means for modulating, in a first modulation format, a first transmission portion comprising address information; and means for modulating, in a second modulation format, a second transmission portion comprising message data transmitted in frames representing a time sequence of N data bits at a predetermined frame rate and a predetermined data bit rate, wherein said second modulation format comprises a multicarrier modulation format providing a plurality of carrier frequencies related to a frequency domain representation of the time sequence of N data bits, and wherein the address information is transmitted at a predetermined symbol rate, and wherein the predetermined frame rate substantially numerically matches the predetermined symbol rate; and means for transmitting said radio frequency signal.

2. The messaging system of claim 1, wherein said first modulation format is frequency modulation.

3. The messaging system of claim 1, wherein the plurality of geographically distributed messaging transmitters provide a simulcast message transmission.

4. The messaging system of claim 1, wherein the predetermined frame rate is less than the predetermined data bit rate.

5. The messaging system of claim 1, wherein said address information includes message characterization information defining the predetermined frame rate.

6. The messaging system of claim 1, wherein the multicarrier modulation format is Orthogonal Frequency Division Multiplexing.

7. The messaging system of claim 6, wherein said multicarrier modulation format of Orthogonal Frequency Division Multiplexing type further includes interleaving of said frames.

8. The messaging system of claim 1, wherein said multicarrier modulation format utilizes a Fast Fourier Transform (FFT) computation.

9. The messaging system of claim 8, wherein the at least one of said plurality of data communication receivers comprises:

means for receiving and demodulating said radio frequency signal transmitted in said first modulation format;

means for decoding said address information and for decoding message characterization information transmitted in said first modulation format;

means, responsive to said message characterization information transmitted during said first transmission portion, for receiving and demodulating said radio frequency signal transmitted in said second modulation format; and means for decoding said message data transmitted in said second modulation format.

10. The messaging system of claim 9, wherein said means for receiving and demodulating said radio frequency signal transmitted in said second modulation format comprises means for demodulating Orthogonal Frequency Division Multiplexing type modulated signals.

11. The messaging system of claim 10, wherein said means for demodulating comprises means for performing an inverse Fast Fourier Transform (IFFT{N}) computation to recover said time sequence of N data bits provided in bits per second representing said message data.

12. The messaging system of claim 9, wherein the at least one of said plurality of data communication receivers further comprises:

means for transmitting a signal indicating a present geographical location of the at least one of said plurality of data communication receivers.

13. The messaging system of claim 12, further comprising a messaging terminal comprising:

means, responsive to said signal indicating said present geographical location, for selectively transmitting from a subset of the plurality of geographically distributed messaging transmitters said second transmission portion.

14. The messaging system of claim 13, wherein said predetermined frame rate is adjusted based upon said present geographical location.

15. The messaging system of claim 13, wherein said subset of the plurality of geographically distributed messaging transmitters contains one transmitter.

16. The messaging system of claim 15, wherein said predetermined frame rate is adjusted based upon said present geographical location and on a calculated signal strength and on a predetermined maximum transmission channel rate without regard to differential delay characteristics.

17. The messaging system of claim 9, wherein a present geographical location of each of said plurality of data communication receivers is preregistered with said messaging system.

18. The messaging system of claim 1, wherein said first modulation format is a multicarrier modulation of Orthogonal Frequency Division Multiplexing, and wherein the address information is transmitted at a predetermined address frame rate, wherein an address frame represents a time sequence of N' data bits.

19. The messaging system of claim 18, wherein N is greater than N'.

20. A data communication receiver, comprising:

a receiver element for receiving and demodulating a radio frequency signal including an address and message characterization information transmitted in a first modulation format;

a first decoder for decoding the address transmitted in said first modulation format;

said receiver element further for receiving and demodulating a radio frequency signal transmitted in a second modulation format, wherein said second modulation format comprises message data transmitted in frames representing a time sequence of N data bits at a predetermined frame rate, wherein said second modulation format comprises a multicarrier modulation format providing a plurality of carrier frequencies related to a frequency domain representation of the time sequence of the N data bits, and wherein the address is transmitted at a predetermined symbol rate, and wherein the predetermined frame rate substantially numerically matches the predetermined symbol rate; and a second decoder for decoding the message data transmitted in said second modulation format.

21. The data communication receiver of claim 20, wherein the address uniquely identifies the data communication receiver to which the message data is directed.

22. The data communication receiver of claim 20 wherein the message characterization information identifies an information service.

23. A messaging system for transmitting a message to at least one of a plurality of data communication receivers, the messaging system comprising a plurality of geographically distributed messaging transmitters, each comprising:

means for generating a radio frequency signal comprising
means for modulating, in a first modulation format, a first transmission portion comprising address information; and
means for modulating, in a second modulation format, a second transmission portion comprising message data transmitted in frames representing a time sequence of N data bits at a predetermined frame rate and a predetermined data bit rate, wherein said second modulation format comprises a multicarrier modulation format providing a plurality of carrier frequencies related to a frequency domain representation of the time sequence of N data bits, and wherein the messaging system controls the predetermined frame rate based on location of the at least one of the plurality of data communication receivers and in accordance with differential delay characteristics of a subset of the geographically distributed messaging transmitters utilized for transmitting to the location; and means for transmitting said radio frequency signal.

* * * * *